US012761862B2

(12) United States Patent
Km et al.

(10) Patent No.: US 12,761,862 B2
(45) Date of Patent: Oct. 13, 2026

(54) DEVICE SELECTION BASED ON AUDIO CODEC

(71) Applicant: Motorola Mobility LLC, Chicago, IL (US)

(72) Inventors: Vishwanath Km, Bengaluru (IN); Ranjeet Gupta, Bengaluru (IN); Michael E. Russell, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 128 days.

(21) Appl. No.: 18/780,990

(22) Filed: Jul. 23, 2024

(65) Prior Publication Data

US 2026/0029984 A1 Jan. 29, 2026

(51) Int. Cl.
*G06F 3/16* (2006.01)
*H04R 3/12* (2006.01)

(52) U.S. Cl.
CPC .............. *G06F 3/162* (2013.01); *G06F 3/165* (2013.01); *H04R 3/12* (2013.01); *H04R 2420/07* (2013.01)

(58) Field of Classification Search
None
See application file for complete search history.

(56) References Cited

U.S. PATENT DOCUMENTS 6,677,895 B1 1/2004 Holt
7,976,386 B2 7/2011 Tran
8,483,853 B1 7/2013 Lambourne
9,244,525 B2 1/2016 Crawford et al.
10,158,536 B2 12/2018 Kim et al.
(Continued)

FOREIGN PATENT DOCUMENTS

CN 107907857 4/2018
CN 107991647 5/2018
(Continued)

OTHER PUBLICATIONS

"[Update] Introducing the New Galaxy SmartTag+: The Smart Way to Find Lost Items", Samsung US Newsroom [online][retrieved Jun. 29, 2021]. Retrieved from the Internet <https://news.samsung.com/us/introducing-the-new-galaxy-smarttag-plus/>., May 11, 2021, 8 Pages.

(Continued)

*Primary Examiner* — Brian T Pendleton
(74) *Attorney, Agent, or Firm* — FIG. 1 Patents

(57) ABSTRACT

In aspects of device selection based on audio codec, a mobile device may have an established Bluetooth connection with a set of devices. The mobile device can query each device of the set of devices, and perform a respective Bluetooth channel sounding procedure with each device of the set of devices to obtain a respective distance between each device and the mobile device. Additionally, the mobile device can detect a respective audio codec corresponding to each device of the set of devices. The mobile device can select a device from the set of devices for audio playback based on the respective distances and one or more audio quality parameters associated with the respective audio codecs. The one or more audio quality parameters may include an audio quality, an audio profile, an interference level, and/or an on-air time.

20 Claims, 6 Drawing Sheets

(56) References Cited

U.S. PATENT DOCUMENTS

| | | | | |
|---|---|---|---|---|
| 10,277,981 | B1 | 4/2019 | Frank | |
| 10,484,832 | B1 | 11/2019 | Tyagi et al. | |
| 10,499,194 | B1 | 12/2019 | Tyagi et al. | |
| 10,554,439 | B2 | 2/2020 | Plummer et al. | |
| 10,869,166 | B2 | 12/2020 | Tyagi et al. | |
| 11,051,260 | B2 | 6/2021 | Gorsica et al. | |
| 11,543,530 | B1 | 1/2023 | Liu et al. | |
| 11,828,832 | B2 | 11/2023 | Henry et al. | |
| 11,832,208 | B2 | 11/2023 | Henry et al. | |
| 11,863,340 | B2 | 1/2024 | Jun et al. | |
| 11,864,056 | B2 | 1/2024 | Faustino | |
| 11,990,012 | B2 | 5/2024 | Russell et al. | |
| 11,991,586 | B2 | 5/2024 | Brumley et al. | |
| 12,004,046 | B2 | 6/2024 | Russell et al. | |
| 12,063,059 | B2 | 8/2024 | Russell et al. | |
| 12,069,120 | B2 | 8/2024 | Russell et al. | |
| 12,101,680 | B2 | 9/2024 | Culiac et al. | |
| 12,112,224 | B2 | 10/2024 | Hollar et al. | |
| 12,200,572 | B2 | 1/2025 | Russell et al. | |
| 12,445,803 | B2 | 10/2025 | Russell et al. | |
| 2007/0254626 | A1 | 11/2007 | Ahlgren | |
| 2012/0027194 | A1 | 2/2012 | Deshpande et al. | |
| 2013/0310055 | A1 | 11/2013 | Dewing et al. | |
| 2014/0057675 | A1 | 2/2014 | Meyers et al. | |
| 2014/0073252 | A1 | 3/2014 | Lee et al. | |
| 2015/0193036 | A1 | 7/2015 | Yoo et al. | |
| 2016/0212579 | A1 | 7/2016 | Duan et al. | |
| 2017/0013406 | A1 | 1/2017 | Oliver et al. | |
| 2017/0023659 | A1 | 1/2017 | Bruemmer et al. | |
| 2017/0039783 | A1 | 2/2017 | Hobel | |
| 2017/0245116 | A1 | 8/2017 | Chu et al. | |
| 2017/0289951 | A1 | 10/2017 | Dey et al. | |
| 2018/0020308 | A1* | 1/2018 | Lai | H04L 65/1069 |
| 2018/0045807 | A1 | 2/2018 | Senna et al. | |
| 2018/0107446 | A1 | 4/2018 | Wilberding et al. | |
| 2018/0133580 | A1 | 5/2018 | Deangelis et al. | |
| 2018/0302869 | A1 | 10/2018 | Hollar | |
| 2019/0041869 | A1 | 2/2019 | Shao et al. | |
| 2019/0058948 | A1* | 2/2019 | Gupta | G06F 3/165 |
| 2019/0132839 | A1 | 5/2019 | Li et al. | |
| 2019/0182734 | A1 | 6/2019 | Laliberte | |
| 2019/0191473 | A1* | 6/2019 | Zhang | H04W 12/50 |
| 2019/0208270 | A1 | 7/2019 | Bates et al. | |
| 2019/0340396 | A1 | 11/2019 | Mills et al. | |
| 2020/0037112 | A1 | 1/2020 | Tyagi et al. | |
| 2020/0228943 | A1 | 7/2020 | Martin et al. | |
| 2020/0364381 | A1 | 11/2020 | Wodrich et al. | |
| 2020/0401365 | A1 | 12/2020 | Wilberding et al. | |
| 2021/0063556 | A1 | 3/2021 | Usaj et al. | |
| 2021/0064043 | A1 | 3/2021 | Kulkarni et al. | |
| 2021/0088456 | A1 | 3/2021 | Asayama et al. | |
| 2021/0092563 | A1 | 3/2021 | Hollar et al. | |
| 2021/0152935 | A1* | 5/2021 | Seldess | G06F 16/903 |
| 2021/0168552 | A1* | 6/2021 | Walther | H04S 7/302 |
| 2021/0190940 | A1 | 6/2021 | Troutman | |
| 2021/0224492 | A1 | 7/2021 | Eisendle et al. | |
| 2021/0241551 | A1 | 8/2021 | Loeshelle | |
| 2021/0304577 | A1 | 9/2021 | Hollar et al. | |
| 2021/0320681 | A1 | 10/2021 | Baek et al. | |
| 2021/0383624 | A1 | 12/2021 | Hoyer et al. | |
| 2022/0095120 | A1 | 3/2022 | Panje et al. | |
| 2022/0201427 | A1 | 6/2022 | Rechenberger | |
| 2022/0244367 | A1 | 8/2022 | Shin et al. | |
| 2022/0283321 | A1 | 9/2022 | Ng et al. | |
| 2022/0357419 | A1 | 11/2022 | Givehchian et al. | |
| 2022/0391164 | A1* | 12/2022 | Bonde | H04W 12/50 |
| 2022/0394347 | A1 | 12/2022 | Cheong et al. | |
| 2022/0394660 | A1 | 12/2022 | Werner et al. | |
| 2022/0414416 | A1 | 12/2022 | O'driscoll et al. | |
| 2023/0075389 | A1 | 3/2023 | Wu et al. | |
| 2023/0078485 | A1 | 3/2023 | Russell et al. | |
| 2023/0079580 | A1 | 3/2023 | Russell et al. | |
| 2023/0168343 | A1 | 6/2023 | Russell et al. | |
| 2023/0169839 | A1 | 6/2023 | Russell et al. | |
| 2023/0171298 | A1 | 6/2023 | Russell et al. | |
| 2023/0184561 | A1 | 6/2023 | Salter et al. | |
| 2023/0195411 | A1 | 6/2023 | Lewis et al. | |
| 2023/0217210 | A1 | 7/2023 | Russell et al. | |
| 2023/0217215 | A1 | 7/2023 | Russell et al. | |
| 2023/0231591 | A1 | 7/2023 | Russell et al. | |
| 2024/0031932 | A1 | 1/2024 | Zhang | |
| 2024/0196130 | A1* | 6/2024 | Agrawal | H04S 7/301 |
| 2024/0334505 | A1* | 10/2024 | Doken | G06F 3/167 |

FOREIGN PATENT DOCUMENTS

| | | |
|---|---|---|
| CN | 108650623 | 10/2018 |
| CN | 109725338 | 5/2019 |
| CN | 109754553 | 5/2019 |
| CN | 111103611 | 5/2020 |
| CN | 112911505 | 6/2021 |
| CN | 113115208 | 7/2021 |
| CN | 113453147 | 9/2021 |
| CN | 217643343 | 10/2022 |
| EP | 3680687 | 7/2020 |
| KR | 102104088 | 4/2020 |
| KR | 102328673 | 11/2021 |
| WO | WO-2019221800 | 11/2019 |

OTHER PUBLICATIONS

"Car Connectivity Consortium", Car Connectivity Consortium [retrieved Jun. 28, 2021]. Retrieved from the Internet <https://carconnectivity.org/>., Feb. 22, 2018, 6 Pages.

"FiRa Consortium, Inc.", FiRa Consortium, Inc. [retrieved Jun. 28, 2021]. Retrieved from the Internet <https://www.firaconsortium.org/>., Aug. 1, 2019, 3 Pages.

"Tile Bluetooth Tracking Device", Tile Inc. [retrieved Jun. 28, 2021]. Retrieved from the Internet <https://www.thetileapp.com/en-us/how-it-works>., 2012, 18 Pages.

U.S. Appl. No. 17/473,477, , "Advisory Action", U.S. Appl. No. 17/473,477, 3 pages.

U.S. Appl. No. 17/473,477, , "Final Office Action", U.S. Appl. No. 17/473,477, Dec. 29, 2023, 5 pages.

U.S. Appl. No. 17/473,477, , "Non-Final Office Action", U.S. Appl. No. 17/473,477, Sep. 14, 2023, 12 pages.

U.S. Appl. No. 17/473,477, , "Non-Final Office Action", U.S. Appl. No. 17/473,477, Apr. 8, 2024, 6 pages.

U.S. Appl. No. 17/473,477, , "Notice of Allowance", U.S. Appl. No. 17/473,477, Jul. 17, 2024, 8 pages.

U.S. Appl. No. 17/473,671, , "Corrected Notice of Allowability", U.S. Appl. No. 17/473,671, Mar. 27, 2024, 2 pages.

U.S. Appl. No. 17/473,671, , "Corrected Notice of Allowability", U.S. Appl. No. 17/473,671, 2 pages.

U.S. Appl. No. 17/473,671, , "Non-Final Office Action", U.S. Appl. No. 17/473,671, 6 pages.

U.S. Appl. No. 17/473,671, , "Notice of Allowance", U.S. Appl. No. 17/473,671, 7 pages.

U.S. Appl. No. 17/536,499, , "Final Office Action", U.S. Appl. No. 17/536,499, 16 pages.

U.S. Appl. No. 17/536,499, , "Non-Final Office Action", U.S. Appl. No. 17/536,499, 13 pages.

U.S. Appl. No. 17/536,535, , "Corrected Notice of Allowability", U.S. Appl. No. 17/536,535, 2 pages.

U.S. Appl. No. 17/536,535, , "Final Office Action", U.S. Appl. No. 17/536,535, 25 pages.

U.S. Appl. No. 17/536,535, , "Non-Final Office Action", U.S. Appl. No. 17/536,535, 20 pages.

U.S. Appl. No. 17/536,535, , "Non-Final Office Action", U.S. Appl. No. 17/536,535, 26 pages.

U.S. Appl. No. 17/536,535, , "Notice of Allowance", U.S. Appl. No. 17/536,535, 7 pages.

U.S. Appl. No. 17/536,535, , "Supplemental Notice of Allowability", U.S. Appl. No. 17/536,535, 2 pages.

U.S. Appl. No. 17/536,636, , "Corrected Notice of Allowability", U.S. Appl. No. 17/536,636, 3 pages.

U.S. Appl. No. 17/536,636, , "Non-Final Office Action", U.S. Appl. No. 17/536,636, 12 pages.

(56) References Cited

OTHER PUBLICATIONS

U.S. Appl. No. 17/536,636, , "Non-Final Office Action", U.S. Appl. No. 17/536,636, 14 pages.
U.S. Appl. No. 17/536,636, , "Notice of Allowance", U.S. Appl. No. 17/536,636, 9 pages.
U.S. Appl. No. 17/566,530, , "Final Office Action", U.S. Appl. No. 17/566,530, 16 pages.
U.S. Appl. No. 17/566,530, , "Non-Final Office Action", U.S. Appl. No. 17/566,530, 14 pages.
U.S. Appl. No. 17/566,530, , "Non-Final Office Action", U.S. Appl. No. 17/566,530, 17 pages.
U.S. Appl. No. 17/566,530, , "Notice of Allowance", U.S. Appl. No. 17/566,530, 8 pages.
U.S. Appl. No. 17/579,933, , "Corrected Notice of Allowability", U.S. Appl. No. 17/579,933, 3 pages.
U.S. Appl. No. 17/579,933, , "Final Office Action", U.S. Appl. No. 17/579,933, 10 pages.
U.S. Appl. No. 17/579,933, , "Non-Final Office Action", U.S. Appl. No. 17/579,933, 11 pages.
U.S. Appl. No. 17/579,933, , "Non-Final Office Action", U.S. Appl. No. 17/579,933, 8 pages.
U.S. Appl. No. 17/579,933, , "Notice of Allowance", U.S. Appl. No. 17/579,933, 6 pages.
U.S. Appl. No. 63/261,929, filed Sep. 30, 2021, 62 pages.
Cheong, Minho et al., U.S. Appl. No. 63/197,867, filed Jun. 7, 2021, 68 pages.
GB2213053.8, , "Combined Search and Examination Report", GB Application No. GB2213053.8, Feb. 23, 2023, 10 pages.
GB2213121.3, , "Search Report", GB Application No. GB2213121.3, Mar. 9, 2023, 5 pages.
GB2216213.5, , "Combined Search and Examination Report", GB Application No. GB2216213.5, Apr. 28, 2023, 10 pages.
Haselton, Todd , "Here's how Apple's AirTag trackers compare to Tile, and why the company is so upset with Apple", CNBC [online][retrieved Jun. 29, 2021]. Retrieved from the Internet <https://www.cnbc.com/2021/04/27/apple-airtags-versus-tile-tracker-how-they-compare.html>., Apr. 27, 2021, 8 Pages.
Km, Vishwanath et al., "Pursuant to MPEP § 2001.06(b) the applicant brings the following co-pending application to the Examiner's attention:", U.S. Appl. No. 18/780,990, filed Jul. 23, 2024, 43 pages.
Pirch, Hans-Juergen et al., "Introduction to Impulse Radio UWB Seamless Access Systems", FiRa Consortium [retrieved Jun. 28, 2021]. Retrieved from the Internet <https://www.firaconsortium.org/sites/default/files/2020-04/fira-introduction-impulse-radio-uwb-wp-en.pdf>., Feb. 2020, 15 Pages.
"Non-Final Office Action", U.S. Appl. No. 17/536,499, 19 pages.
"Final Office Action", U.S. Appl. No. 17/566,522, 10 pages.
"Final Office Action", U.S. Appl. No. 17/536,499, 20 pages.
U.S. Appl. No. 17/566,522 , "Non-Final Office Action", U.S. Appl. No. 17/566,522, 10 pages.
U.S. Appl. No. 17/566,530 , "Corrected Notice of Allowability", U.S. Appl. No. 17/566,530, 2 pages.
"Corrected Notice of Allowability", U.S. Appl. No. 17/566,522, 2 pages.
"Notice of Allowance", U.S. Appl. No. 17/566,522, 7 pages.

* cited by examiner

DEVICE SELECTION BASED ON AUDIO CODEC

BACKGROUND

Today's person is afforded a tremendous selection of devices that are capable of performing a multitude of tasks. For instance, desktop and laptop computers provide computing power and screen space for productivity and entertainment tasks. Further, smartphones and tablets provide computing power and communication capabilities in highly portable form factors. Individual instances of devices may provide functionality for discrete sets of tasks, and the ability for devices to intercommunicate with one another greatly expands available task options and operating environments. For instance, a typical smartphone is able to wirelessly route audio to one or multiple speakers for playback, e.g., via a Bluetooth (BT) connection. While the ability for devices to intercommunicate provides for numerous usage scenarios, it also introduces challenges regarding management of such connections.

BRIEF DESCRIPTION OF THE DRAWINGS

Implementations of the techniques for device selection based on audio codec are described with reference to the following Figures. The same numbers may be used throughout to reference like features and components shown in the Figures.

DETAILED DESCRIPTION

Figure 1:
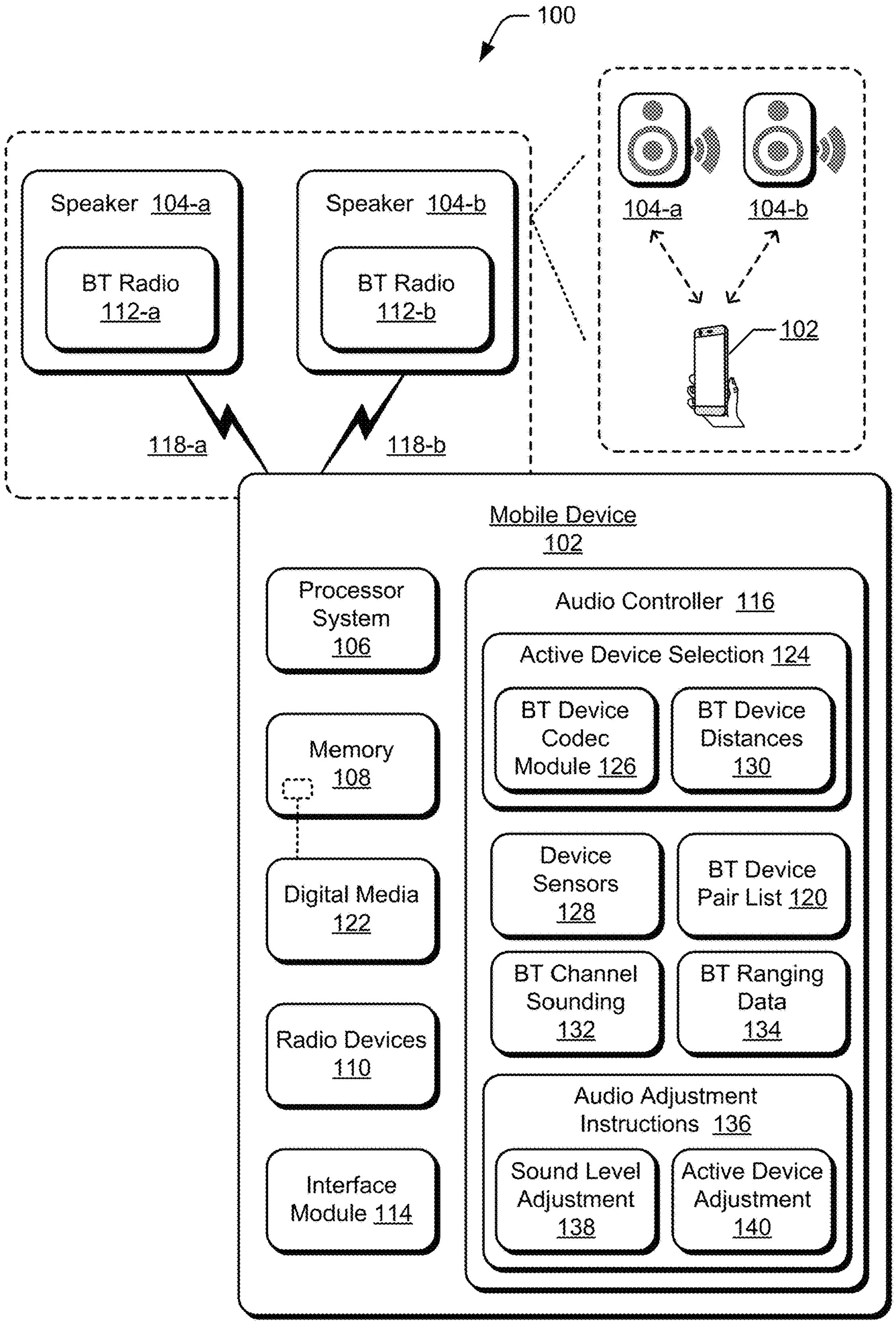
FIG. 1. illustrates an example environment for device selection based on audio codec in accordance with one or more implementations as described herein.

Implementations of the techniques for device selection based on audio codec may be implemented as described herein. A mobile device, such as any type of a wireless device, media device, mobile phone, flip phone, client device, tablet, computing, communication, entertainment, gaming, media playback, and/or any other type of computing, consumer, and/or electronic device, or a system of any combination of such devices, may be configured to perform techniques for device selection based on audio codec as described herein. Generally, Bluetooth (BT) enabled smart devices, such as smartphones and audio speakers, can implement the described techniques to improve active device selection for audio playback.

In aspects of the techniques for device selection based on audio codec, a system includes a source device (such as a mobile device) and a set of two or more media devices in an environment. Media devices may be defined as devices in an environment that are capable of BT connection with at least the source device and can output audio, such as speakers, headphones or headsets, display units (e.g., televisions or other devices with audio and video output capabilities) or the like, among other examples. A media device may be configured to support an audio codec, which may be defined as a software and/or hardware component implemented to encode and decode digital audio data. For example, audio data transmitted from the source device may be compressed according to parameters of the audio codec to fit within bandwidth constraints of BT communications. Once received at the media device, the compressed audio data may be decompressed using the audio codec to retrieve the original audio data, which is then output from the media device.

A given audio codec may be associated with one or more audio quality parameters that define the quality, latency, and efficiency of audio transmissions from the source device to the media device. An audio codec that supports lossless compression, for example, may provide higher quality audio output compared to an audio codec that supports lossy compression. As another example, an audio codec capable of relatively low latency may provide better performance for gaming than an audio codec with higher latency. Some audio codecs may be more efficient with regard to power consumption, which may be important for portable media devices. In many scenarios, a source device may be capable of connecting to multiple media devices, each of which may have a different audio codec and, accordingly, may provide different user experiences. The source device may select an active device from the multiple media devices for audio playback. That is, although the mobile device may maintain connections with each media device of the multiple media devices, the mobile device may select one media device to which audio is actively routed for audio playback (e.g., and the mobile device may refrain from routing audio to the remaining media devices).

As a non-limiting example, a user has a mobile device and a set of BT devices, including a portable BT speaker, a pair of wall-mounted BT speakers, and a BT headset in a same environment (e.g., an office, a room, a house). Each BT device may be associated with a respective audio codec. The mobile device can maintain a list (e.g., a pairing list) of BT devices with which the mobile device has previously established a BT connection. When the mobile device has an opportunity to connect or reconnect to the set of BT devices (e.g., the mobile device leaves and then re-enters the environment, the BT devices are powered on after being off, etc.), the mobile device may automatically query the pairing list to detect each BT device and reestablish respective connections. The mobile device may select a BT device of the set of BT devices to be the active device for audio playback. In conventional techniques, the active device may be automatically selected as the BT device that most recently connected to the mobile device.

However, the most recently connected BT device may not always provide the best user experience. For example, the environment may be the user's home, and the user may wish to listen to relatively high quality audio (e.g., while watching a movie). The wall-mounted BT speakers may have a high-definition or high-fidelity audio codec. Automatically connecting to the BT headset, which may have an audio codec associated with low latency but lower quality audio than the wall-mounted BT speakers, as the most recently connected device may not provide the best user experience, or be the user's desired connection. As another example, the portable BT speaker may have an audio codec similar to that of the wall-mounted BT speakers but may be located elsewhere in the home. Conventional techniques may not account for locations of the BT devices (e.g., no preference is given to the BT device nearest to the user).

Accordingly, the described techniques provide for improved user experience by enabling a mobile device to select an active device for audio playback according to multiple parameters. For example, the mobile device may be equipped with an audio controller to perform BT channel sounding with each BT device of a set of BT devices to determine a relative distance between the mobile device and each BT device. The mobile device can also detect a respective audio codec associated with each BT device, and then select the active device from the set of BT devices based on tradeoffs between the relative distances and the audio codecs. For example, if two of the BT devices are relatively near to the mobile device but have different audio codecs, the mobile device may select the BT device with a higher quality audio codec for audio playback. Alternatively, if a BT device with a higher quality codec is located relatively far from the mobile device, the mobile device may prioritize selection of a BT device that is nearer to the mobile device for audio playback.

By enabling automatic selection of active devices based on relative distances and audio codecs, the described techniques can conserve user and system resources (e.g., power, memory, processor bandwidth, network bandwidth, etc.) that may otherwise be used to perform or modify selection (s) manually (e.g., via user input). Thus, the described techniques can improve the operation efficiency of BT connections and audio playback. Further, user burden can be reduced by performing such selections automatically while reducing user interaction to initiate and manage the connections.

While features and concepts of the described techniques for device selection based on audio codec is implemented in any number of different devices, systems, environments, and/or configurations, implementations of the techniques for device selection based on audio codec are described in the context of the following example devices, systems, and methods.

FIG. 1 illustrates an example system 100 for device selection based on audio codec, as described herein. The system 100 includes a mobile device 102, a speaker 104-*a*, and a speaker 104-*b*. Examples of mobile device 102 include at least one of any type of a wireless device, mobile device, mobile phone, flip phone, client device, companion device, tablet, computing device, communication device, entertainment device, gaming device, media playback device, or any other type of computing and/or electronic device. Although only two speakers 104-*a* and 104-*b* are shown and described in this example system 100, an environment may include any number and implementation of speaker and/or audio playback devices, and device selection based on audio codec, as described herein, is applicable.

In some implementations, the devices, applications, modules, servers, and/or services described herein communicate via a communication network, such as for data communication with the mobile device 102. The communication network can include a wired and/or a wireless network. The communication network may be implemented using any type of network topology and/or communication protocol, and is represented or otherwise implemented as a combination of two or more networks, to include IP-based networks, cellular networks, and/or the Internet. The communication network may include mobile operator networks that are managed by a mobile network operator and/or other network operators, such as a communication service provider, mobile phone provider, and/or Internet service provider.

The mobile device 102 can be implemented with various components, such as a processor system 106 and a memory 108, as well as any number and combination of different components as further described with reference to the example device 500 shown in FIG. 5. In implementations, the mobile device 102 includes various radio devices 110 for wireless communication with other devices. For example, the mobile device 102 may include a Bluetooth (BT) and/or BT Low Energy (BLE) transceiver, as well as a near field communication (NFC) transceiver. In some cases, the mobile device 102 may include at least one of a Wi-Fi radio, a cellular radio, a global positioning satellite (GPS) radio, or any available type of device communication interface.

Similarly, the speakers 104 may each be implemented with various components, such as a processor system and memory, as well as any number and combination of different components as further described with reference to the example device 500 shown in FIG. 5. In implementations, the speakers 104 may each include various radios for wireless communication with other devices. For example, each speaker 104 may include a BT and/or BLE transceiver, an NFC transceiver, and/or at least one of a Wi-Fi radio, a cellular radio, a GPS radio, or any available type of device communication interface. As illustrated in FIG. 1, the speaker 104-*a* is equipped with a BT radio 112-*a* and the speaker 104-*b* is equipped with a BT radio 112-*b*.

The mobile device 102 includes various functionality that enables the device to implement different aspects of device selection based on audio codec, as described herein. In one or more examples, an interface module 114 represents functionality (e.g., logic and/or hardware) enabling the mobile device 102 to interconnect and interface with other devices and/or networks, such as the communication network and/or the speakers 104. For example, the interface module 114 enables wireless and/or wired connectivity of the mobile device 102.

The mobile device 102 can include and implement various device applications, such as any type of messaging application, email application, video communication application, cellular communication application, music/audio application, gaming application, media application, social platform applications, and/or any other of the many possible types of various device applications. Many of the device applications have an associated application user interface that is generated and displayed for user interaction and viewing, such as on a display screen of the mobile device 102. Generally, an application user interface, or any other type of video, image, graphic, and the like is digital image content that is displayable on the display screen of the mobile device 102.

In the example system 100 for device selection based on audio codec, the mobile device 102 implements an audio controller 116 (e.g., as a device application). As shown in this example, the audio controller 116 represents functionality (e.g., logic, software, and/or hardware) enabling aspects of the described techniques for device selection based on audio codec. The audio controller 116 can be implemented as computer instructions stored on computer-readable storage media and can be executed by a processor system of the mobile device 102. Alternatively, or in addition, the audio controller 116 can be implemented at least partially in hardware of the mobile device 102.

In one or more implementations, the audio controller 116 includes independent processing, memory, and/or logic components functioning as a computing and/or electronic device integrated with the mobile device 102. Alternatively, or in addition, the audio controller 116 can be implemented in software, in hardware, or as a combination of software and hardware components. In this example, the audio controller 116 is implemented as a software application or module, such as executable software instructions (e.g., computer-executable instructions) that are executable with a processor system of the mobile device 102 to implement the techniques and features described herein. As a software application or module, the audio controller 116 can be stored on computer-readable storage memory (e.g., memory of a device), or in any other suitable memory device or electronic data storage implemented with the controller. Alternatively or in addition, the audio controller 116 is implemented in firmware and/or at least partially in computer hardware. For example, at least part of the audio controller 116 is executable by a computer processor, and/or at least part of the audio controller is implemented in logic circuitry.

In implementations, the mobile device 102 may be communicatively linked, generally by wireless connection, to the speakers 104. For example, the radio devices 110 of the mobile device 102 can communicate with the BT radio 112-*a* via a communication link 118-*a* (e.g., a BT communication link) and can communicate with the BT radio 112-*b* via a communication link 118-*b* (e.g., a BT communication link). To connect to new BT devices (e.g., with which the mobile device 102 has not previously established a BT connection), the mobile device 102 may transmit (e.g., broadcast, communicate) a signal to discover BT devices within range of the mobile device 102. The mobile device 102 can maintain a BT device pair list 120 that includes each device to which the mobile device 102 has established a previous connection (e.g., a previous BT connection). To connect to a known BT device, such as a speaker 104, the mobile device 102 may query each device on the BT device pair list 120 to determine whether a respective device is within range and available for connection. Generally, the mobile device 102 can automatically attempt to establish a BT connection with each device on the BT device pair list 120 that is within range and available.

Once paired (e.g., connected), the mobile device 102 can route audio and/or video output, such as digital media 122, to one or both speakers 104. In some cases, when the mobile device 102 is paired to multiple BT devices such as the speakers 104, the mobile device 102 may be configured to automatically select an active device (e.g., from among the multiple BT devices) to which the digital media 122 is routed for audio playback. As described herein, the mobile device 102 may select an active device for routing the digital media 122 for audio playback based on a relative distance between the mobile device 102 and the active device, and/or based on an audio codec implemented by the active device. In the example of FIG. 1, the mobile device 102 may connect to both speakers 104 and then may select either the speaker 104-*a* or the speaker 104-*b* as the active device. After selecting the active device, the mobile device 102 can route digital media 122 to the active device (e.g., to either the speaker 104-*a* or the speaker 104-*b*).

The mobile device 102 in this example system 100 includes various functionality for performing aspects of active device selection based on audio codec, such as the audio controller 116 for active device selection 124, a BT device codec module 126, and various device sensors 128. In implementations, the active device selection 124 represents functionality for selecting the active device from a set of two or more BT devices, such as the speakers 104, based on the BT device codec module 126 and determined BT device distances 130. The BT device codec module 126 represents functionality for detecting a respective audio codec associated with each speaker 104. The BT device distances 130 can be determined by the audio controller 116 as the relative distances between the mobile device 102 and the speaker 104-*a* and the speaker 104-*b*. The active device selection 124 can be displayed as a notification on a display device of the mobile device 102 that indicates the active device.

The respective audio codecs of the connected BT devices detected by the BT device codec module 126 may each be associated with one or more audio quality parameters. The one or more audio quality parameters include, but are not limited to, an audio quality, an audio profile, an interference level, and/or an on-air time. As an example, the BT device codec module 126 may detect that an audio codec implemented by the speaker 104-*a* is associated with a relatively high audio quality and a relatively low interference level. The BT device codec module 126 may further detect that an audio codec implemented by the speaker 104-*b* is associated with a relatively high audio quality and a relatively high interference level.

For the active device selection 124 to select the active device, the audio controller 116 can consider the respective relative device distances 130 between the mobile device 102 and each speaker 104, as well as the one or more audio quality parameters associated with the respective audio codecs. Continuing the above example, the audio controller 116 may determine that the speaker 104-*a* and the speaker 104-*b* are each within a relatively close distance to the mobile device 102. The audio controller 116 may then determine that the audio codec implemented by the speaker 104-*a* is of higher priority for selection than the audio codec implemented by the speaker 104-*b* (e.g., due to their respective interference levels). Accordingly, the audio controller 116 may select the speaker 104-*a* as the active device for the active device selection.

In some examples, to obtain the BT device distances 130, the audio controller 116 may utilize BT channel sounding 132, which represents functionality for performing a respective BT channel sounding procedure between the mobile device 102 and each speaker 104. As described in more detail with reference to FIGS. 2A and 2B, the BT channel sounding 132 provides BT ranging data 134 from one or more of the BT radios in the environment of this example system 100, such as from the BT radio 112-*a* and/or the BT radio 112-*b*. The BT ranging data 134 may include, but is not limited to, phase-based ranging (PBR) data, round trip time (RTT) data, angle of arrival (AoA) data, and/or angle of departure (AoD) data. For instance, the BT ranging data 134 may include RTT measurements (e.g., of data packets) and PBR measurements (e.g., of carrier wave tones) per frequency of a set of frequencies. The BT channel sounding 132 can also provide a respective received signal strength indicator (RSSI) associated with each speaker 104 (e.g., based on signals received from each speaker 104). The audio controller 116 can receive the BT ranging data 134 as obtained by the BT channel sounding 132, and the audio controller estimates or otherwise determines the relative BT device distances 130 between the mobile device 102 and each speaker 104.

Additionally, or alternatively, the audio controller 116 may collect sensor data from the device sensors 128. The device sensors 128 are representative of functionality to detect various physical and/or logical environmental features in relation to the mobile device 102, such as motion, light, image detection and recognition, time and date, position, location, touch detection, sound, temperature, and so forth. Examples of the device sensors 128 include hardware and/or logical sensors such as an accelerometer, a gyroscope, a camera, a microphone, a clock, biometric sensors, touch input sensors, position sensors, environmental sensors (e.g., for temperature, pressure, humidity, and so on), proximity sensors, geographical location information sensors (e.g., Global Positioning System (GPS) functionality), and so forth.

In some examples, the audio controller 116 may correlate the sensor data from the device sensors 128 with the BT ranging data 134 to identify respective locations of each speaker 104 (e.g., using the estimated relative distances). In implementations, the audio controller 116 may utilize the BT ranging data 134 received by the BT channel sounding 132 to monitor the locations of the speakers 104 in the environment of this example system 100, such as relative to the mobile device 102. For instance, the audio controller 116 can monitor the BT ranging data 134 received from each speaker 104 and/or the sensor data over a time period to determine whether any change in the respective relative distance and/or the respective location has occurred.

In some cases, the audio controller 116 can adjust the audio playback of the digital media 122 by communicating, via corresponding communication links 118, audio adjustment instructions 136 to the speaker 104-*a* and/or the speaker 104-*b*. In some examples, the audio adjustment instructions 136 can be generated based on monitoring the locations of the speakers 104, for instance, to initiate a sound level adjustment 138 of audio emitting from the speaker(s) 104 or to initiate an active device adjustment 140 to select a different active device. Continuing the above example in which the speaker 104-*a* is selected as the active device, the audio controller 116 may determine that a change in the relative distance between the mobile device 102 and the speaker 104-*a* has occurred, such that the mobile device 102 is now relatively farther away from the speaker 104-*a*. The audio controller 116 can communicate the audio adjustment instructions 136 to initiate the sound level adjustment 138 to increase the sound level of the audio playback being emitted from the speaker 104-*a*. Alternatively, the audio controller 116 can communicate the audio adjustment instructions 136 to initiate the active device adjustment 140 (e.g., to select a different device as the active device for the audio playback).

Figure 2A:
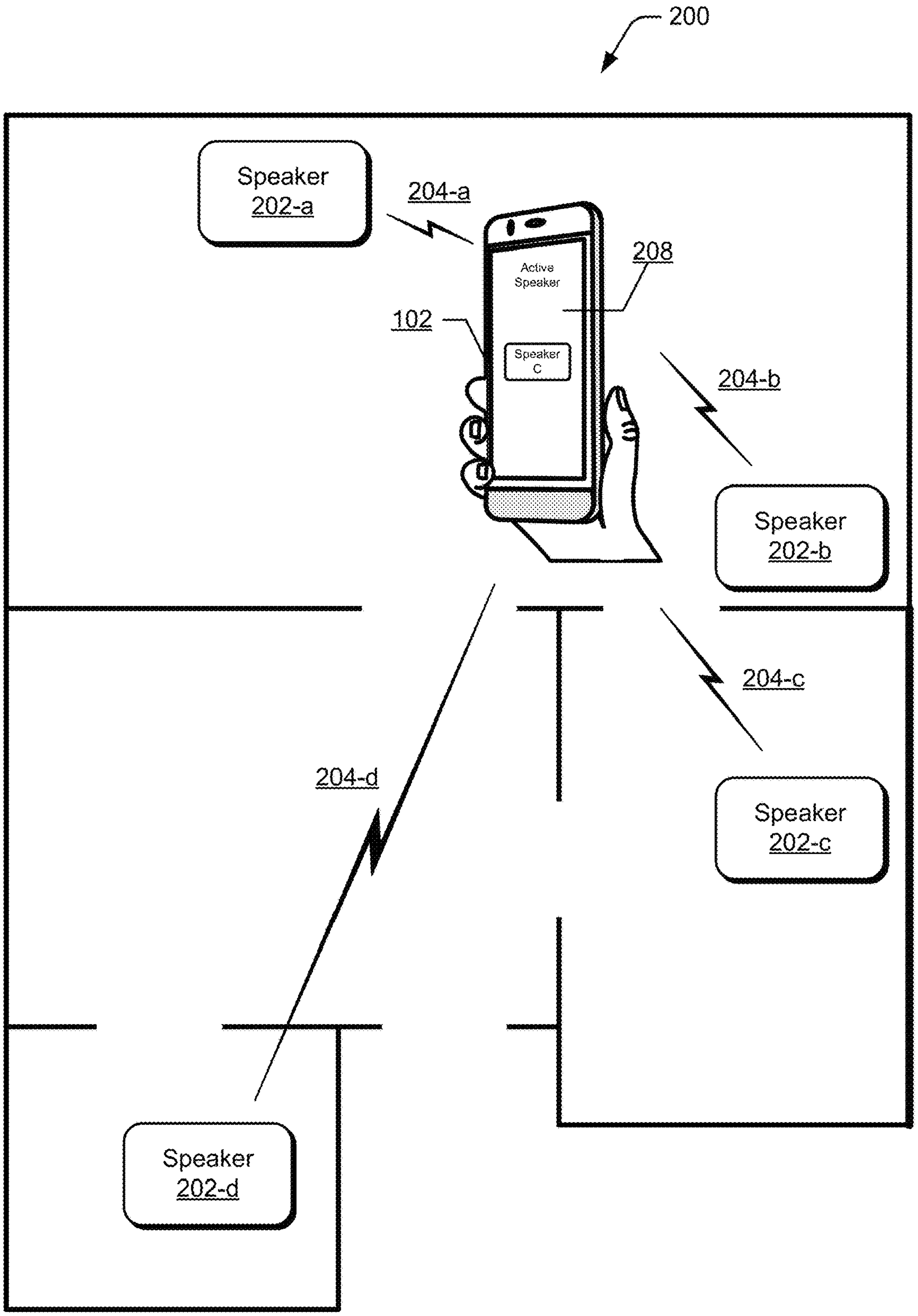
FIGS. 2A and 2B illustrate example environments for device selection based on audio codec in accordance with one or more implementations as described herein.
Figure 2B:
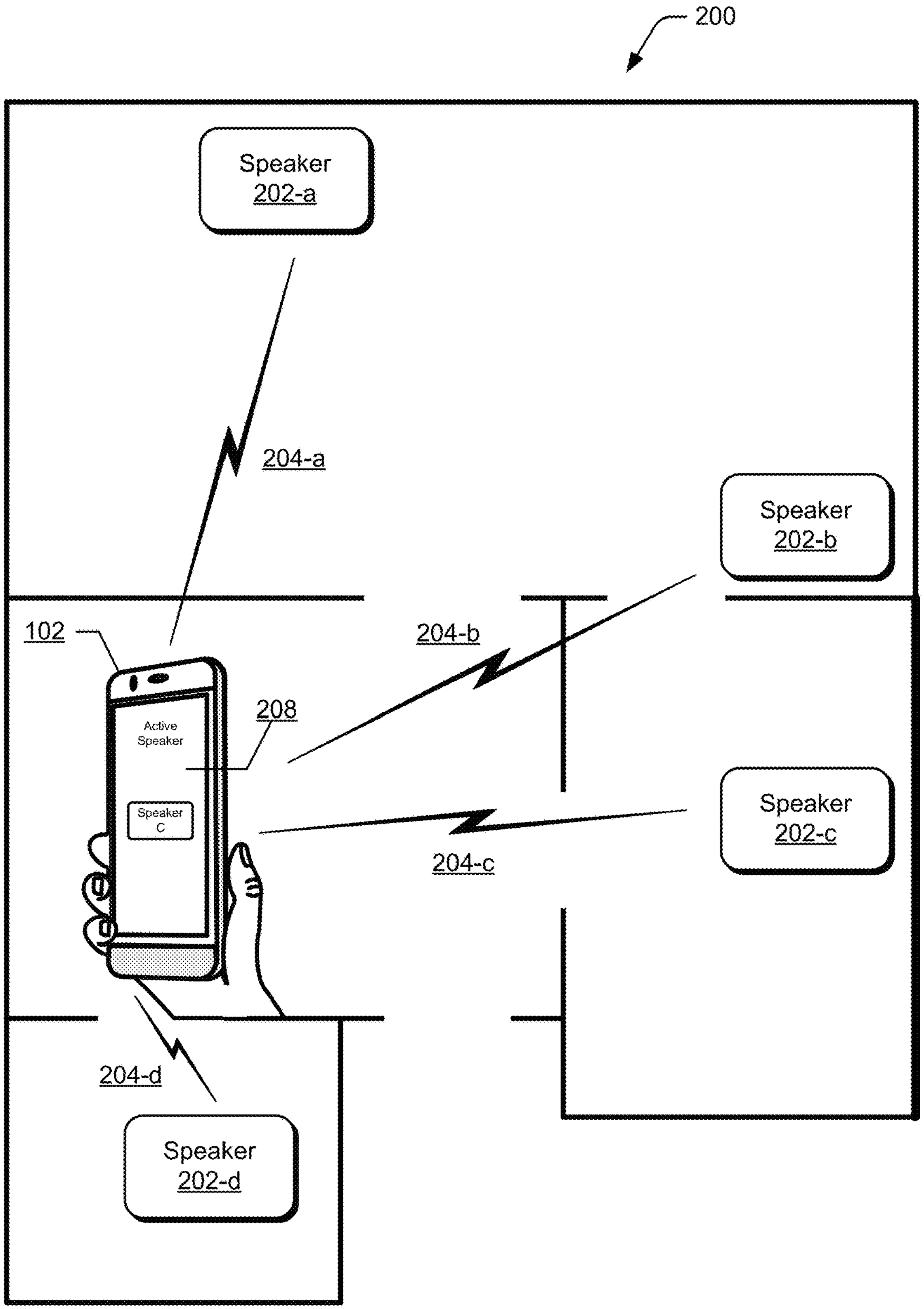

FIGS. 2A and 2B illustrate an environment 200 in which device selection based on audio codec can be implemented, as described herein. The environment 200 may incorporate attributes of the environment shown and described with reference to the example system 100 introduced above. For instance, the environment 200 includes the mobile device 102 and speakers 202, such as described with reference to FIG. 1. The environment 200 may be an example of a home, office building, or the like. In the environment 200, a user of the mobile device 102 may be at a first location (FIG. 2A), and subsequently move the mobile device 102 to a second location (FIG. 2B), such as in the user's home.

The mobile device 102 is an example of any type of portable device, such as a smartphone, a tablet, a wearable device (e.g., a smartwatch, ear buds, etc.), or the like. The speakers 202 and the mobile device 102 may be BT-capable, and in this example environment 200, each speaker 202 has a respective connection 204 (e.g., BT connections 204-*a*, 204-*b*, 204-*c*, and 204-*d*) previously established with the mobile device 102.

Each speaker 202 may include or be an example of a BT device capable of audio playback, such as a portable speaker, a wall-mounted speaker, a headset, a soundbar, a display device (e.g., a monitor, a tablet), or the like, among other examples. In the example of FIGS. 2A and 2B, for instance, the speaker 202-*a* may be a wireless headset, the speaker 202-*b* and the speaker 202-*d* may be portable speakers, and the speaker 202-*c* may be a wired soundbar. Each speaker 202 may implement an audio codec, which is associated with one or more audio quality parameters, such as an audio quality, an audio profile, an interference level (e.g., a level of interference associated with communications between the speaker 202 and the mobile device 102), an on-air time (e.g., a time duration during which the speaker 202 is actively transmitting or receiving signals), or the like, among other examples.

Initially, the mobile device 102 may not have any active connections with any speaker 202, but may have stored information about respective previously-established connections 204 with each speaker 202 in a pair list (e.g., the BT device pair list 120). For instance, the mobile device 102 may have previously connected to each speaker 202 and may have stored information (e.g., addressable information, security information, authorization information, location information) associated with each speaker 202 in the pair list. At some point, the user leaves the house with the mobile device 102 such that the mobile device 102 is not currently paired to any speaker 202. Additionally, or alternatively, one or more of the speakers 202 may be powered off. Upon return to the house, or after powering on the speakers 202, the mobile device 102 may automatically pair to one or more of the speakers 202 using the stored information from the pair list. To this end, the mobile device 102 may query each speaker 202 on the pair list to determine if the respective speaker 202 is available (e.g., powered on and within range). The mobile device 102 can then connect with one or more of the speakers 202 that are available via the respective connections 204.

To initiate audio playback via a speaker 202, the mobile device 102 can automatically select an active device (e.g., an active speaker) from among the speakers 202 as described herein. For example, the mobile device 102 may select the speaker 202 that is nearest in proximity to the mobile device 102. Alternatively, the mobile device 102 may select the speaker 202 associated with the relatively best audio codec (e.g., according to corresponding audio quality parameter(s)). In other examples, the mobile device 102 may select the speaker 202 according to a compromise between proximity and audio codecs. The mobile device 102 may also consider proximity when selecting a speaker 202 based on an associated audio codec. For instance, the mobile device 102 may adjust a volume of audio playback based on proximity to the speaker 202 (e.g., the mobile device 102 increases the volume when the speaker 202 is at a distance and decreases the volume when the speaker 202 is close in proximity to the mobile device 102), and the mobile device 102 may select the speaker 202 that has a relatively best audio codec when adjusting the volume.

Accordingly, the mobile device 102 can initiate a respective BT channel sounding procedure with each speaker 202 to calculate or otherwise obtain a respective distance between the mobile device 102 and each speaker 202. Measurements obtained by BT channel sounding 132 may be referred to as ranging data (e.g., the BT ranging data 134) and can be used by the mobile device 102 to calculate a relative distance between the mobile device 102 and each speaker 202.

Generally, a BT channel sounding procedure can use phase-based ranging (PBR), round trip time (RTT), or both to accurately measure the distance between two BLE-connected devices, also commonly referred to as an initiator and a reflector. The mobile device 102 and a speaker 202 may each operate as the initiator or the reflector during a BT channel sounding procedure. The BT channel sounding procedure includes a series of channel sounding events. During a channel sounding event, the initiator and the reflector alternately transmit and receive carrier wave tones used for distance estimation and data packets (e.g., cryptographically random modulated data packets) related to the channel sounding procedure. A channel sounding event includes a set of subevents, with each subevent including a set of channel sounding steps. A channel sounding step includes a sequence of coordinated carrier wave tone transmissions between the initiator and the reflector.

During a channel sounding subevent, the initiator and the reflector may each measure the RTT of the data packets and the PBR of the carrier wave tones. The RTT may be defined as the time duration that a signal (e.g., one or more data packets) takes to travel from the initiator to the reflector and back again. PBR employs phase rotation in radio frequency (RF) signals, where the initiator and the reflector may each estimate a phase offset (e.g., a phase difference) between a received unmodulated signal (e.g., a carrier wave tone) and a local oscillator signal. After each channel sounding subevent, the initiator and the reflector may exchange measurement results. The channel sounding subevent may be repeated over each frequency of a set of frequencies (e.g., up to 72 frequencies, such as across a frequency band), where the RTT and the PBR measurements are obtained per frequency to account for ambiguities and provide multipath accuracy. By comparing the phase differences between the carrier wave tones from both the initiator and the reflector, and the RTTs of the data packets, the initiator and the reflector may estimate their relative distance.

The audio controller 116 implemented by the mobile device 102 can determine which speaker 202 is nearest in proximity to the mobile device 102 based on the relative distances. The audio controller 116 can then select, as the active device, the closest speaker 202. In some cases, such as in the example of FIG. 2A, more than one speaker 202 (e.g., the speaker 202-*a*, the speaker 202-*b*, and the speaker 202-*c*) may be relatively close in proximity to the mobile device 102. In such cases, the mobile device 102 may further select the active device from among the speaker 202-*a*, the speaker 202-*b*, and the speaker 202-*c* based on the respective audio codecs corresponding to each speaker 202.

The audio controller 116 of the mobile device 102 can detect an audio codec supported by each speaker 202. In some instances, the audio codecs are prioritized for selection according to corresponding audio quality parameters (e.g., by assigning higher priorities to audio codecs and/or audio quality parameters that provide improved user experience), where a "best" audio codec is associated with a highest priority. An audio quality, for example, may represent parameters indicative of the clarity, fidelity, and/or audio definition provided by a given audio codec. Audio qualities may include a frequency response, bit rate, sample rate, dynamic range, latency, channel separation, distortion, and the like. The audio controller 116 of the mobile device 102 can prioritize relatively wider frequency responses, higher bit rates, higher sample rates, etc. that provide improved user experience.

An audio profile may be implemented in hardware or software and may refer to a collection of rules (e.g., protocols, standards) that define how audio data is transmitted and managed by a device (e.g., a BT device), such as a speaker 202. Some audio profiles may be intended for specific use cases and/or devices, such as for hands-free calling with a BT headset (e.g., a headset profile (HSP)), audio streaming from a source device (e.g., the mobile device 102) to an audio playback device such as the speaker 202 (e.g., an advanced audio distribution profile (A2DP)), or the like. Accordingly, an audio profile may provide improved user experience for its intended use case, but may provide poor audio quality and negatively impact user experience if utilized in other scenarios. Similarly, an interference level associated with an audio codec may impact user experience. Higher interference levels may correspond to increased latency, playback interruptions, and so on. Thus, the mobile device 102 may prioritize low interference levels over higher interference levels. Shorter on-air times may be prioritized over longer on-air times, as a shorter on-air time may reduce latency and the likelihood of interference.

Thus, in the example environment 200 of FIG. 2A, the mobile device 102 can select an active device from among the speakers 202-*a*, 202-*b*, and 202-*c* that has the relatively better audio codec (e.g., is associated with a relatively highest audio quality), a highest prioritized audio quality parameter, or the like. For instance, the audio controller 116 of the mobile device 102 can compare an audio codec associated with the speaker 202-*a*, an audio codec associated with the speaker 202-*b*, and an audio codec associated with the speaker 202-*c*. The speaker 202-*c*, as a soundbar, may have a high-definition codec and may be associated with relatively higher audio quality compared to the speaker 202-*b* (e.g., a portable speaker). The speaker 202-*b*, in turn, may have an audio codec associated with a relatively higher audio quality than that of the speaker 202-*a* (e.g., the wireless headset). The audio controller 116 may therefore select the speaker 202-*c* as the active device and can initiate audio playback via the speaker 202-*c* (e.g., route audio to be emitted by the speaker 202-*c*).

Additionally, or alternatively, the mobile device 102 may select the active device from among the speaker 202-*a*, the speaker 202-*b*, and the speaker 202-*c* based on some compromise between the relative distances and the audio codecs. For example, the audio controller 116 of the mobile device 102 can determine that, while the speaker 202-*a* has a shorter relative distance to the mobile device 102 than the speaker 202-*b*, the speaker 202-*b* is prioritized over the speaker 202-*a* based on the respective audio codecs. Additionally, while the speaker 202-*c* has the highest audio quality, the speaker 202-*b* has a shorter relative distance to the mobile device 102 compared to the speaker 202-*c*. Thus, the mobile device 102 may select the speaker 202-*b* as an appropriate compromise between distance and audio codecs among the speakers 202.

In some cases, the mobile device 102 can display a notification 208 on a display device of the mobile device 102 that notifies the user of the active device. For instance, in the example of FIG. 2A, the notification 208 may identify the speaker 202-*c* as being the active device selected for audio playback.

In implementations, the audio controller 116 of the mobile device 102 can monitor the locations of the speakers 202 (e.g., over time). For example, the mobile device 102 may continue to receive BT ranging data from the speakers 202 and may regularly repeat the estimations of respective relative distances between the mobile device 102 and each speaker 202. Additionally, or alternatively, the mobile device 102 may continue to obtain sensor data from the one or more device sensors 128 of the mobile device 102, and the audio controller 116 regularly correlates the sensor data with the BT ranging data 134 to identify the respective locations of each speaker 202 (e.g., relative to the mobile device 102).

Based on the monitoring, the audio controller 116 of the mobile device 102 can detect changes in locations of the mobile device 102 and/or the one or more speakers 202. In the example of FIG. 2B, the mobile device 102 may move to a different location (e.g., room of the house) compared to the example of FIG. 2A. Accordingly, the audio controller 116 of the mobile device 102 can detect that the respective relative distances between the mobile device 102 and each speaker 202 have changed. For example, the audio controller 116 can determine that the speaker 202-*b* is now relatively far from the mobile device 102, and that the nearest speaker 202 is now the speaker 202-*d*, as shown in the example of FIG. 2B.

In some cases, the mobile device 102 may communicate audio adjustment instructions 136 to the one or more speakers 202 to initiate a sound level (e.g., volume) adjustment of audio being emitted from the speaker(s) 202. Generally, the audio controller 116 of the mobile device 102 can initiate to increase or decrease the sound level based on the relative distance between the devices increasing or decreasing. Continuing the above example, and based on detecting that the relative distance between the mobile device 102 and the speaker 202-*b* has increased, the audio controller 116 can initiate to communicate the audio adjustment instructions 136 to the speaker 202-*b* to increase the sound level (e.g., volume) of the audio playback emitted from that particular speaker.

Additionally, or alternatively, the mobile device 102 may communicate audio adjustment instructions 136 to one or more speakers 202 to initiate a re-selection of the active device for audio playback. For example, the mobile device 102 may communicate the audio adjustment instructions 136 to transfer the audio playback from the currently active device (e.g., the speaker 202-*b*) to a different device. In some cases, the mobile device 102 may repeat the above-described procedure (e.g., by determining the relative distances and selecting the active device based on the relative distances and the respective audio codecs). In the example of FIG. 2B, for instance, the audio controller 116 of the mobile device 102 can determine that the speaker 202-*d* is relatively closer to the mobile device 102 than the speaker 202-*b*. The audio controller 116 can then select the speaker 202-*d* as the active device and transfer the audio playback from the speaker 202-*b* to the speaker 202-*d*. Additionally, the mobile device 102 may display the notification 208 indicating that the speaker 202-*d* has been selected as the active device.

Example methods 300 and 400 are described with reference to respective FIGS. 3 and 4 in accordance with one or more implementations of device selection based on audio codec, as described herein. Generally, any services, components, modules, managers, controllers, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
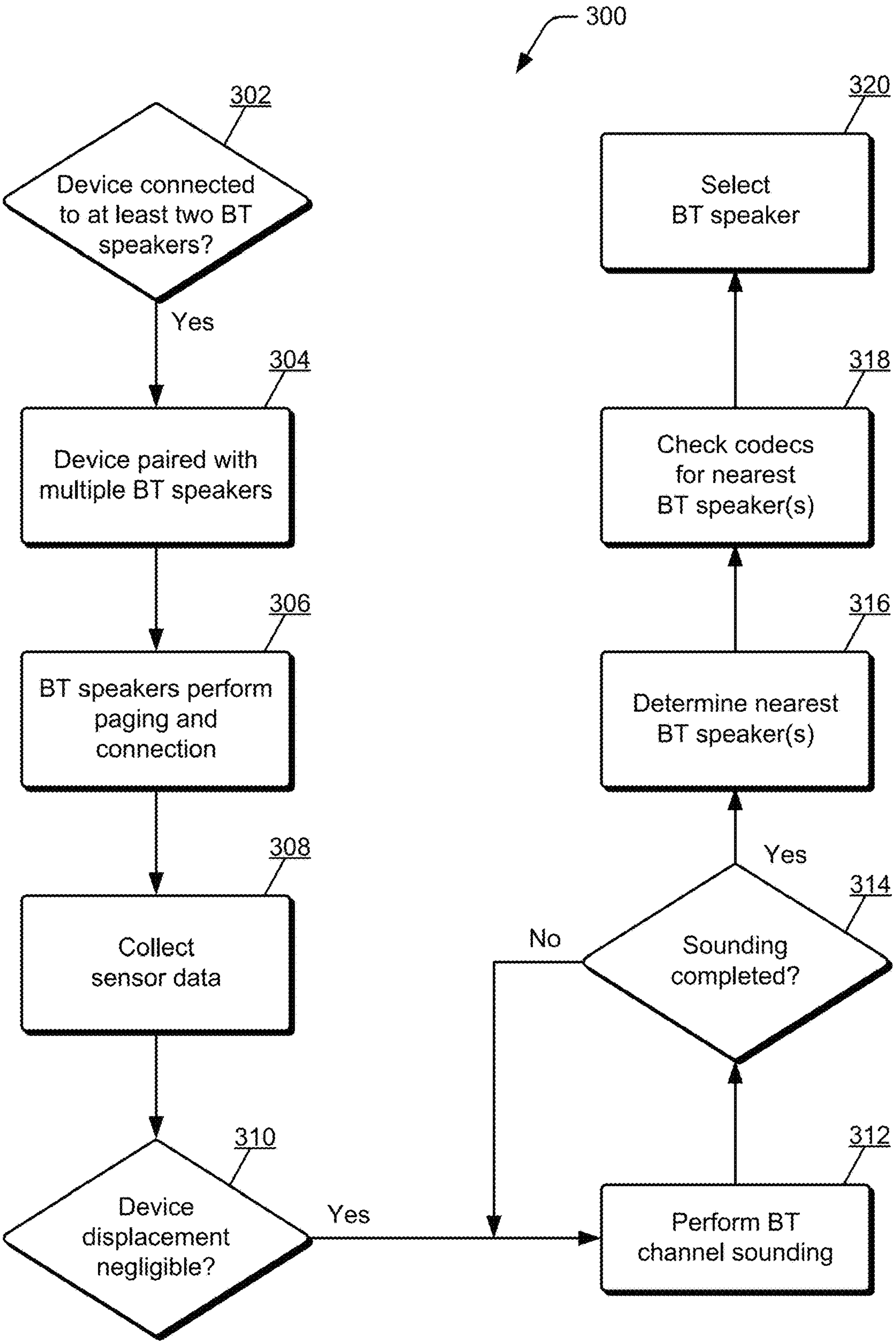
FIGS. 3 and 4 illustrate example methods for device selection based on audio codec in accordance with one or more implementations of the techniques described herein.

FIG. 3 illustrates example method 300 for device selection based on audio codec. The order in which the method is described is not intended to be construed as a limitation, and any number or combination of the described method operations may be performed in any order to perform a method, or an alternate method. The method 300 may be performed by a mobile device (e.g., the mobile device 102), a set of two or more BT devices (e.g., the speakers 104, the speakers 202), and/or cooperatively between some combination thereof. The method 300 may be an example of a method by which the mobile device 102 selects an active device for audio playback according to the techniques described herein.

At 302, the audio controller 116 of the mobile device 102 detects whether the mobile device is connected to at least two BT speakers, such as the speakers 104 as described with reference to FIG. 1, the speakers 202 as described with reference to FIGS. 2A and 2B, or the like.

At 304, if the mobile device 102 is connected to at least two BT speakers (e.g., as detected at 302), the mobile device 102 pairs with the at least two BT speakers. For example, the mobile device 102 may pair with a BT speaker A, a BT speaker B, and/or a BT speaker C. In some cases, the mobile device 102 may query the BT device pair list 120 and initiate the pairing by transmitting a respective pair request message to each BT speaker. The mobile device 102 exchanges authentication information with each BT speaker.

At 306, the BT speakers A, B, and/or C perform paging connection as each BT speaker attempts to establish an active connection to the mobile device 102. The mobile device 102 exchanges paging messages with each BT speaker to initiate connection establishment.

At 308, the mobile device 102 collects sensor data from one or more of the device sensors 128 of the mobile device 102. The sensor data may be motion data, location data, position data, or the like, among other examples.

At 310, the audio controller 116 of the mobile device 102 determines whether a displacement of the mobile device 102 is negligible. For instance, the audio controller 116 of the mobile device 102 may utilize the sensor data collected at 308 to determine a displacement in a location or position of the mobile device 102. If a displacement exists, the audio controller 116 determines whether the displacement is negligible, for instance, by comparing the displacement to a threshold displacement. If the displacement satisfies (e.g., is less than) the threshold displacement, the displacement may be considered negligible and the procedure continues at 312. A non-negligible displacement may indicate that the mobile device 102 is in motion, such that proceeding with the method 300 may be impractical or unnecessary, and the mobile device 102 may abort the remainder of the method 300.

At 312, assuming the displacement at 310 is negligible, the mobile device 102 performs BT channel sounding. The mobile device 102 polls BT channel sounding frames to each connected BT speaker and receives BT ranging data from each connected BT speaker in response.

At 314, the audio controller 116 of the mobile device 102 checks whether the BT channel sounding has been completed. If no, the mobile device 102 continues polling BT channel sounding frames until the BT channel sounding concludes. If yes, the method continues at 316.

At 316, the audio controller 116 of the mobile device 102 utilizes the BT ranging data from the BT channel sounding to estimate a respective relative distance between the mobile device 102 and each BT speaker. The audio controller 116 can then identify the nearest BT speaker(s) in proximity to the mobile device 102. In some examples, multiple BT speakers may be identified as near to the mobile device 102.

At 318, the audio controller 116 of the mobile device 102 checks the audio codecs associated with the nearest BT speaker(s). For example, the audio controller 116 determines whether the nearest BT speaker(s) has a high-definition audio codec. Additionally, or alternatively, the audio controller 116 identifies one or more audio quality parameters associated with the audio codecs, such as an audio profile, an audio quality, an interference level, an on-air time, or a combination thereof. In some examples, the audio controller 116 considers proximity of the BT speakers when checking the audio codecs at 318. For instance, during audio playback, the audio controller 116 may modify audio playback volume based on a distance between the active BT speaker and the mobile device 102. The audio controller 116 decreases the volume for audio playback via BT speaker(s) that are relatively close in proximity and increases the volume for BT speaker(s) that are at a distance from the mobile device 102. Different audio codecs may provide different audio quality at different volumes.

At 320, the audio controller 116 of the mobile device 102 selects a BT speaker from the BT speakers as the active device for audio playback. In some examples, the audio controller 116 selects the BT speaker that is nearest to the mobile device 102 (e.g., as determined at 316). In other examples, such as when multiple BT speakers are near to the mobile device 102, the audio controller 116 selects the BT speaker that has a high-definition audio codec, or has an audio codec associated with at least one audio quality parameter having a higher or highest priority (e.g., compared to other audio quality parameters associated with other audio codecs). In implementations, the audio controller 116 of the mobile device 102 can compare the audio codecs supported by each BT speaker and select the BT speaker having an audio codec that provides an optimal user experience. In some cases, there may be contention between one or more BT speakers in close proximity to the mobile device 102 and one or more BT speakers associated with a preferred audio codec. For instance, the audio controller 116 can select a BT speaker that is farther from the mobile device 102 but that has an audio codec that provides improved performance and user experience compared to a BT speaker closer in proximity to the mobile device 102. Additionally, or alternatively, the audio controller 116 may consider the proximity of a BT speaker when selecting a BT speaker based on an associated audio codec, e.g., based on modifying the volume for audio playback according to the proximity as described at 318. In still other examples, the audio controller 116 of the mobile device 102 selects the BT speaker according to a compromise (e.g., a tradeoff) between the audio codec and the relative distance to the mobile device 102 (e.g., as described with reference to FIGS. 2A and 2B).

Figure 4:
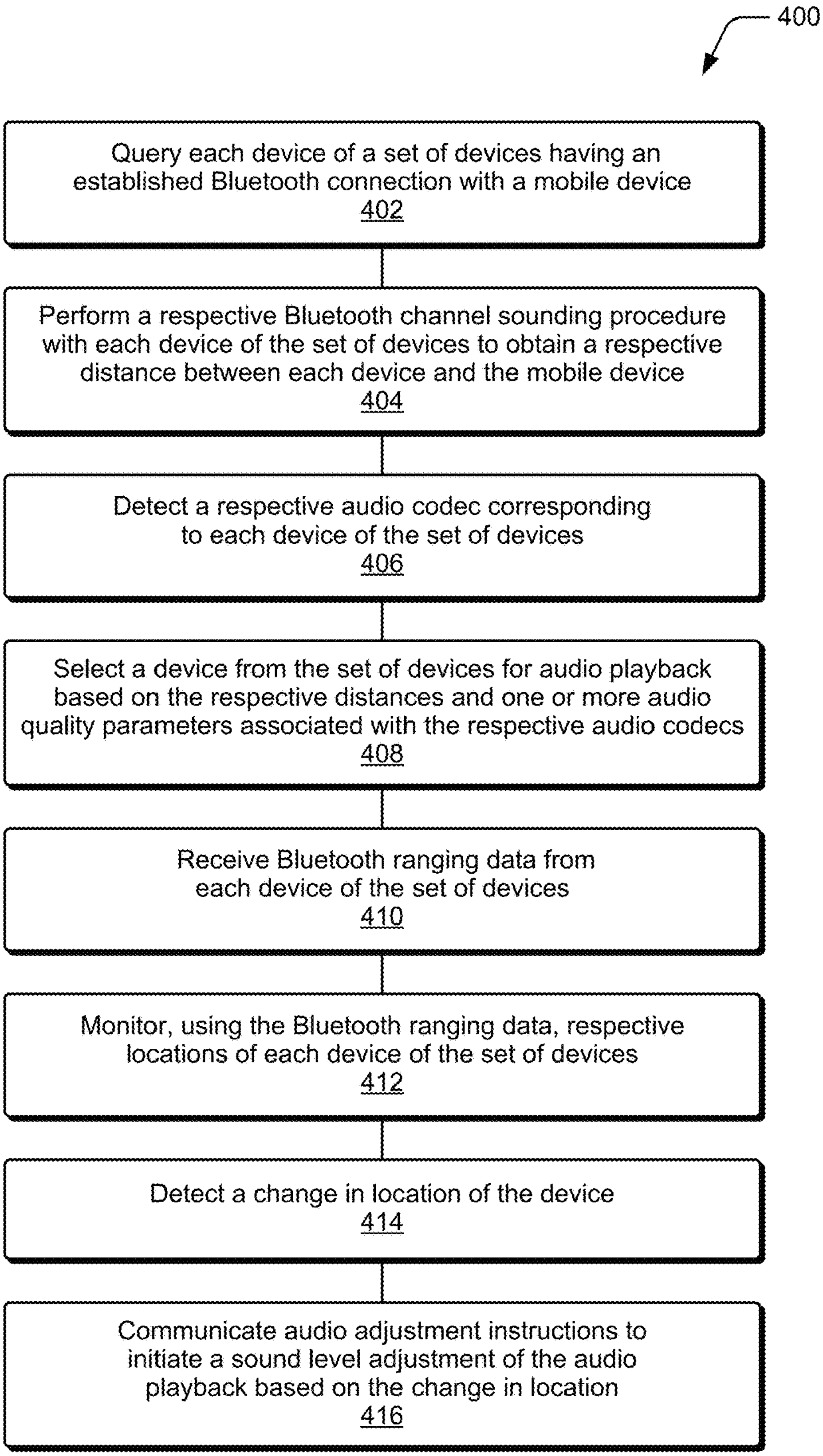

FIG. 4 illustrates example method 400 for device selection based on audio codec. The order in which the method is described is not intended to be construed as a limitation, and any number or combination of the described method operations may be performed in any order to perform a method, or an alternate method.

At 402, each device of a set of devices is queried. For example, the audio controller 116 queries each BT device of the BT device pair list 120 (e.g., each BT device with which the mobile device 102 has previously had an established BT connection).

At 404, a respective BT channel sounding procedure is performed with each device of the set of devices. A respective distance between the mobile device and each device of the set of devices is obtained. For instance, the audio controller 116 implements the BT channel sounding 132 to obtain the BT ranging data 134 from each device. The audio controller 116 uses the BT ranging data 134 to estimate or otherwise determine the BT device distances 130.

At 406, a respective audio codec corresponding to each device of the set of devices is detected. As an example, the audio controller 116 implements the BT device codec module 126 to identify (e.g., based on signaling received from each device, such as at 402) an audio codec supported by a given device of the set of devices. In some cases, the audio controller 116 may save (e.g., store) or update the BT device pair list 120 with information about the respective audio codec supported by each device.

At 408, a device from the set of devices is selected for audio playback based on the respective distances and one or more audio quality parameters associated with the respective audio codecs. For example, the audio controller 116 initiates the active device selection 124 to select a device as the active device based on the BT device codec module 126 and/or based on the BT device distances 130. As a specific, non-limiting example, the audio controller 116 selects a device as the active device selection 124 based on the device having a high-definition audio codec, as detected at 406. As another example, the audio controller 116 selects a device as the active device based on the device being closer to the mobile device 102 than a second device of the set of devices.

At 410, BT ranging data is received from each device of the set of devices. For instance, the audio controller 116 initiates the BT channel sounding 132 repeatedly (e.g., over time), to obtain additional BT ranging data 134 from each device of the set of devices.

At 412, respective locations of each device of the set of devices are monitored using the BT ranging data. The audio controller 116, for example, estimates the BT device distances 130 using the BT ranging data 134 each time that the audio controller 116 receives additional BT ranging data, and then determines locations of each device based on the BT device distances. Additionally, or alternatively, the audio controller 116 receives sensor data from one or more of the device sensors 128 and can use the sensor data to determine a location of the mobile device 102 (e.g., with respect to each device of the set of devices).

At 414, a change in location of a device is detected. The device may be the active device selected at 408, a different device of the set of devices (e.g., an inactive device), or the mobile device 102. For instance if, at 412, the audio controller 116 detects a change in a relative distance (e.g., of the BT device distances 130) between the mobile device 102 and a device of the set of devices, the audio controller 116 determines (e.g., detects) a change in the location of the device and/or a change in the location of the mobile device 102.

At 416, audio adjustment instructions are communicated to initiate a sound level adjustment of the audio playback based on the change in location. For example, based on detecting the change in location at 414, the audio controller 116 communicates the audio adjustment instructions 136 (e.g., to the active device selected at 408), to the device having a change in location as detected at 414, or some combination thereof. As described with reference to FIGS. 1-3, for instance, the audio controller 116 initiates a sound level adjustment 138 to modify a level of sound being emitted from the active device and/or an active device adjustment 140 to select a different device of the set of devices as the active device.

Figure 5:
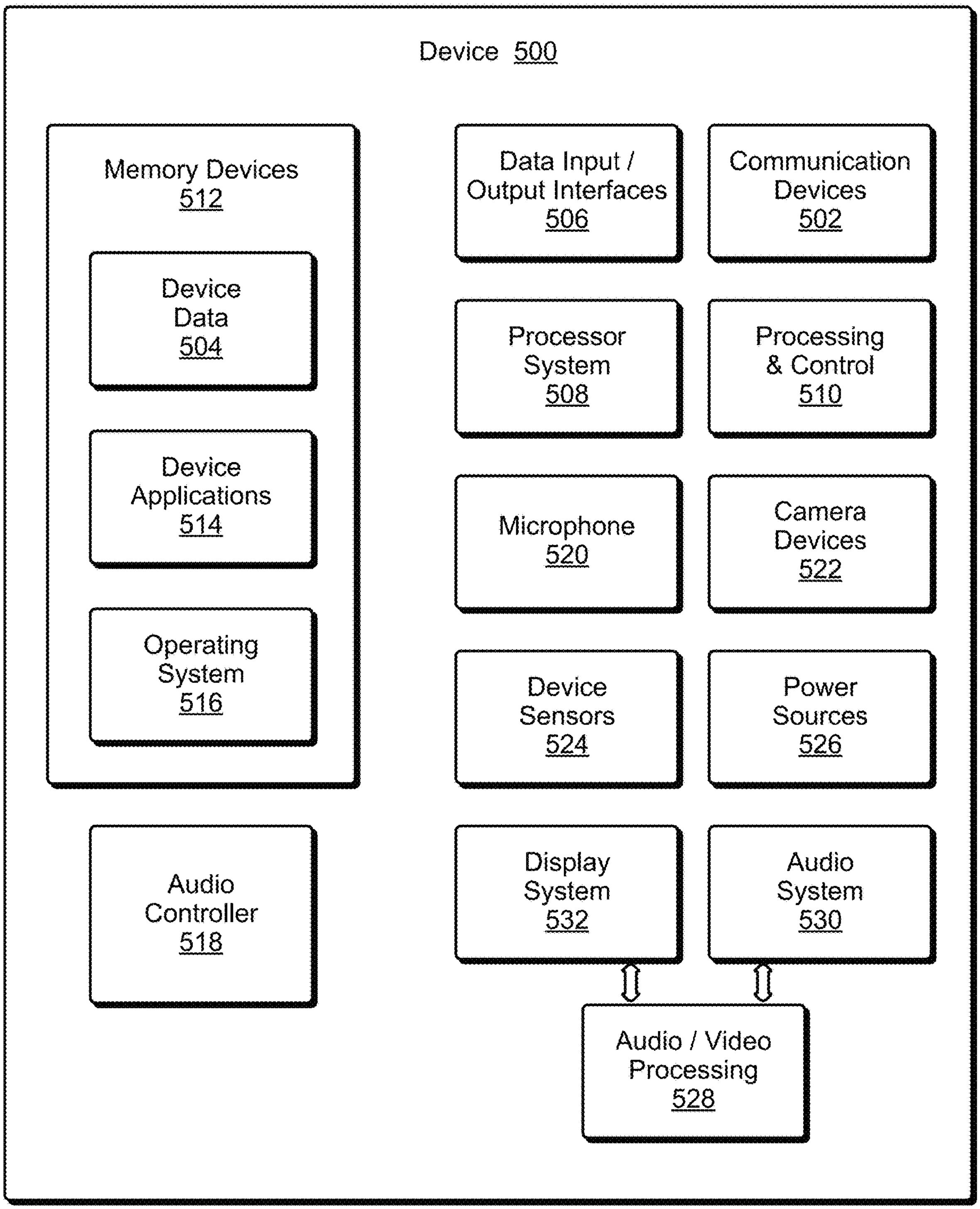
FIG. 5 illustrates various components of an example device that may be used to implement the techniques for device selection based on audio codec as described herein.

FIG. 5 illustrates various components of an example device 500, which can implement aspects of the techniques and features for device selection based on audio codec, as described herein. The example device 500 may be implemented as any of the devices described with reference to the previous FIGS. 1-4, such as any type of a wireless device, mobile device, mobile phone, flip phone, client device, companion device, display device, tablet, computing, communication, entertainment, gaming, media playback, and/or any other type of computing, consumer, and/or electronic device. For example, the mobile device 102 described with reference to FIGS. 1-4 may be implemented as the example device 500.

The example device 500 can include various, different communication devices 502 that enable wired and/or wireless communication of device data 504 with other devices. The device data 504 can include any of the various device data and content that is generated, processed, determined, received, stored, and/or communicated from one computing device to another. Generally, the device data 504 can include any form of audio, video, image, graphics, and/or electronic data that is generated by applications executing on a device. The communication devices 502 can also include transceivers for cellular phone communication and/or for any type of network data communication.

The example device 500 can also include various, different types of data input/output (I/O) interfaces 506, such as data network interfaces that provide connection and/or communication links between the devices, data networks, and other devices. The data I/O interfaces 506 may be used to couple the device to any type of components, peripherals, and/or accessory devices, such as a computer input device that may be integrated with the example device 500. The I/O interfaces 506 may also include data input ports via which any type of data, information, media content, communications, messages, and/or inputs may be received, such as user inputs to the device, as well as any type of audio, video, image, graphics, and/or electronic data received from any content and/or data source.

The example device 500 includes a processor system 508 of one or more processors (e.g., any of microprocessors, controllers, and the like) and/or a processor and memory system implemented as a system-on-chip (SoC) that processes computer-executable instructions. The processor system 508 may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively, or in addition, the device may be implemented with any one or combination of software, hardware, firmware, or fixed logic circuitry that may be implemented in connection with processing and control circuits, which are generally identified at 510. The example device 500 may also include any type of a system bus or other data and command transfer system that couples the various components within the device. A system bus can include any one or combination of different bus structures and architectures, as well as control and data lines.

The example device 500 also includes memory and/or memory devices 512 (e.g., computer-readable storage memory) that enable data storage, such as data storage devices implemented in hardware which may be accessed by a computing device, and that provide persistent storage of data and executable instructions (e.g., software applications, programs, functions, and the like). Examples of the memory devices 512 include volatile memory and non-volatile memory, fixed and removable media devices, and any suitable memory device or electronic data storage that maintains data for computing device access. The memory devices 512 can include various implementations of random-access memory (RAM), read-only memory (ROM), flash memory, and other types of storage media in various memory device configurations. The example device 500 may also include a mass storage media device.

The memory devices 512 (e.g., as computer-readable storage memory) provide data storage mechanisms, such as to store the device data 504, other types of information and/or electronic data, and various device applications 514 (e.g., software applications and/or modules). For example, an operating system 516 may be maintained as software instructions with a memory device 512 and executed by the processor system 508 as a software application. The device applications 514 may also include a device manager, such as any form of a control application, software application, signal-processing and control module, code that is specific to a particular device, a hardware abstraction layer for a particular device, and so on.

In this example, the device 500 includes an audio controller 518 that implements various aspects of the described features and techniques described herein. The audio controller 518 may be implemented with hardware components and/or in software as one of the device applications 514, such as when the example device 500 is implemented as the mobile device 102 described with reference to FIGS. 1-4. An example of the audio controller 518 is the audio controller 116 implemented by the mobile device 102, such as a software application and/or as hardware components in the mobile device. In implementations, the audio controller 518 may include independent processing, memory, and logic components as a computing and/or electronic device integrated with the example device 500.

The example device 500 can also include a microphone 520 (e.g., to capture an audio of a user) and/or camera devices 522 (e.g., to capture images), as well as device sensors 524, such as may be implemented as components of an inertial measurement unit (IMU). The device sensors 524 may be implemented with various sensors, such as a gyroscope, an accelerometer, and/or other types of motion sensors to sense motion of the device. The device sensors 524 can generate sensor data vectors having three-dimensional parameters (e.g., rotational vectors in x, y, and z-axis coordinates) indicating location, position, acceleration, rotational speed, and/or orientation of the device. The example device 500 can also include one or more power sources 526, such as when the device is implemented as a wireless device and/or a mobile device. The power sources may include a charging and/or power system, and may be implemented as a flexible strip battery, a rechargeable battery, a charged super-capacitor, and/or any other type of active or passive power source.

The example device 500 can also include an audio and/or video processing system 528 that generates audio data for an audio system 530 and/or generates display data for a display system 532. The audio system and/or the display system may include any types of devices or modules that generate, process, display, and/or otherwise render audio, video, display, and/or image data. Display data and audio signals may be communicated to an audio component and/or to a display component via any type of audio and/or video connection or data link. In implementations, the audio system and/or the display system are integrated components of the example device 500. Alternatively, the audio system and/or the display system are external, peripheral components to the example device.

Although implementations for device selection based on audio codec have been described in language specific to features and/or methods, the appended claims are not necessarily limited to the specific features or methods described. Rather, the specific features and methods are disclosed as example implementations for device selection based on audio codec, and other equivalent features and methods are intended to be within the scope of the appended claims. Further, various different examples are described, and it is to be appreciated that each described example may be implemented independently or in connection with one or more other described examples. Additional aspects of the techniques, features, and/or methods discussed herein relate to one or more of the following:

A mobile device, comprising: at least one memory; and at least one processor coupled with the at least one memory and configured to cause the mobile device to query each device of a set of devices having an established BT connection with the mobile device; perform a respective BT channel sounding procedure with each device of the set of devices to obtain a respective distance between each device and the mobile device; detect a respective audio codec corresponding to each device of the set of devices; and select a device from the set of devices for audio playback based at least in part on the respective distances and one or more audio quality parameters associated with the respective audio codecs.

Alternatively, or in addition to the above-described mobile device, any one or combination of: to select the device from the set of devices, the at least one processor is configured to cause the mobile device to select the device based on one of a distance between the device and the mobile device, an audio codec corresponding to the device, or a compromise that takes into account the audio codec corresponding to the device and the distance between the device and the mobile device. To select the device from the set of devices, the at least one processor is configured to cause the mobile device to determine, based at least in part on the one or more audio quality parameters, that the device is associated with a high-definition audio codec. To select the device from the set of devices, the at least one processor is configured to cause the mobile device to determine, based at least in part on the respective distances, that the device is closer to the mobile device than a second device of the set of devices. To perform the respective BT channel sounding procedure, the at least one processor is configured to cause the mobile device to receive BT ranging data from each device of the set of devices, and monitor, using the BT ranging data, respective locations of each device of the set of devices. To monitor the respective locations of each device, the at least one processor is configured to cause the mobile device to obtain sensor data from one or more sensors of the mobile device, and correlate the sensor data with the BT ranging data to identify the respective locations of each device. The at least one processor is configured to cause the mobile device to detect a change in location of at least one device of the set of devices, and transfer the audio playback from the device to another device of the set of devices based at least in part on the change in the location. The at least one processor is configured to cause the mobile device to detect a change in location of the device, and communicate audio adjustment instructions to initiate a sound level adjustment of the audio playback based at least in part on the change in the location. The at least one processor is configured to cause the mobile device to display, on a display device of the mobile device, a notification indicating that the device is selected as an active playback device for the audio playback. The one or more audio quality parameters comprise at least one of an audio quality, an audio profile, an interference level, or an on-air time. The at least one processor is configured to cause the mobile device to communicate audio adjustment instructions to initiate a sound level adjustment of the audio playback based at least in part on the respective distances and the one or more audio quality parameters.

A method, comprising: querying, by a mobile device, each device of a set of devices having an established BT connection with the mobile device; performing, by the mobile device, a respective BT channel sounding procedure with each device of the set of devices to obtain a respective distance between each device and the mobile device; detecting, by the mobile device, a respective audio codec corresponding to each device of the set of devices; and selecting, by the mobile device, a device from the set of devices for audio playback based at least in part on the respective distances and one or more audio quality parameters associated with the respective audio codecs.

Alternatively, or in addition to the above-described method, any one or combination of: selecting the device from the set of devices includes selecting the device based on one of a distance between the device and the mobile device, an audio codec corresponding to the device, or a compromise that takes into account the audio codec corresponding to the device and the distance between the device and the mobile device. Selecting the device from the set of devices includes determining, based at least in part on the one or more audio quality parameters, that the device is associated with a high-definition audio codec. Selecting the device from the set of devices includes determining, based at least in part on the respective distances, that the device is closer to the mobile device than a second device of the set of devices. Performing the respective BT channel sounding procedure includes receiving BT ranging data from each device of the set of devices; and monitoring, using the BT ranging data, respective locations of each device of the set of devices. Detecting a change in location of the device; and communicating audio adjustment instructions to initiate a sound level adjustment of the audio playback based at least in part on the change in location.

A system, comprising: a set of devices having an established BT connection with a mobile device; and a processor configured to implement an audio controller to perform a respective BT channel sounding procedure with each device of the set of devices to obtain a respective distance to each of the devices; and select a device from the set of devices for audio playback based at least in part on the respective distances and one or more audio quality parameters associated with a respective audio codec of each of the devices.

Alternatively, or in addition to the above-described system, any one or combination of: to select the device from the set of devices, the audio controller is configured to select the device based on one of a distance between the device and the mobile device, an audio codec corresponding to the device, or a compromise that takes into account the audio codec corresponding to the device and the distance between the device and the mobile device. To select the device from the set of devices, the audio controller is configured to determine, based at least in part on the one or more audio quality parameters, that the device is associated with a high-definition audio codec.

What is claimed is:

1. A mobile device, comprising:

at least one memory; and at least one processor coupled with the at least one memory and configured to cause the mobile device to:

query each device of a set of devices having an established Bluetooth connection with the mobile device;

perform a respective Bluetooth channel sounding procedure with each device of the set of devices to obtain a respective distance between each device and the mobile device;

detect a respective audio codec corresponding to each device of the set of devices; and select a device from the set of devices for audio playback based at least in part on the respective distances and one or more audio quality parameters associated with the respective audio codecs.

2. The mobile device of claim 1, wherein, to select the device from the set of devices, the at least one processor is configured to cause the mobile device to select the device based on one of a distance between the device and the mobile device, an audio codec corresponding to the device, or a compromise that takes into account the audio codec corresponding to the device and the distance between the device and the mobile device.

3. The mobile device of claim 1, wherein, to select the device from the set of devices, the at least one processor is configured to cause the mobile device to determine, based at least in part on the one or more audio quality parameters, that the device is associated with a high-definition audio codec.

4. The mobile device of claim 1, wherein, to select the device from the set of devices, the at least one processor is configured to cause the mobile device to determine, based at least in part on the respective distances, that the device is closer to the mobile device than a second device of the set of devices.

5. The mobile device of claim 1, wherein, to perform the respective Bluetooth channel sounding procedure, the at least one processor is configured to cause the mobile device to:

receive Bluetooth ranging data from each device of the set of devices; and monitor, using the Bluetooth ranging data, respective locations of each device of the set of devices.

6. The mobile device of claim 5, wherein, to monitor the respective locations of each device, the at least one processor is configured to cause the mobile device to:

obtain sensor data from one or more sensors of the mobile device; and correlate the sensor data with the Bluetooth ranging data to identify the respective locations of each device.

7. The mobile device of claim 5, wherein the at least one processor is configured to cause the mobile device to:

detect a change in location of at least one device of the set of devices; and transfer the audio playback from the device to another device of the set of devices based at least in part on the change in the location.

8. The mobile device of claim 5, wherein the at least one processor is configured to cause the mobile device to:

detect a change in location of the device; and communicate audio adjustment instructions to initiate a sound level adjustment of the audio playback based at least in part on the change in the location.

9. The mobile device of claim 1, wherein the at least one processor is configured to cause the mobile device to display, on a display device of the mobile device, a notification indicating that the device is selected as an active playback device for the audio playback.

10. The mobile device of claim 1, wherein the one or more audio quality parameters comprise at least one of an audio quality, an audio profile, an interference level, or an on-air time.

11. The mobile device of claim 1, wherein the at least one processor is configured to cause the mobile device to communicate audio adjustment instructions to initiate a sound level adjustment of the audio playback based at least in part on the respective distances and the one or more audio quality parameters.

12. A method, comprising:

querying, by a mobile device, each device of a set of devices having an established Bluetooth connection with the mobile device;

performing, by the mobile device, a respective Bluetooth channel sounding procedure with each device of the set of devices to obtain a respective distance between each device and the mobile device;

detecting, by the mobile device, a respective audio codec corresponding to each device of the set of devices; and selecting, by the mobile device, a device from the set of devices for audio playback based at least in part on the respective distances and one or more audio quality parameters associated with the respective audio codecs.

13. The method of claim 12, wherein selecting the device from the set of devices comprises selecting the device based on one of a distance between the device and the mobile device, an audio codec corresponding to the device, or a compromise that takes into account the audio codec corresponding to the device and the distance between the device and the mobile device.

14. The method of claim 12, wherein selecting the device from the set of devices comprises determining, based at least in part on the one or more audio quality parameters, that the device is associated with a high-definition audio codec.

15. The method of claim 12, wherein selecting the device from the set of devices comprises determining, based at least in part on the respective distances, that the device is closer to the mobile device than a second device of the set of devices.

16. The method of claim 12, wherein performing the respective Bluetooth channel sounding procedure comprises:

receiving Bluetooth ranging data from each device of the set of devices; and monitoring, using the Bluetooth ranging data, respective locations of each device of the set of devices.

17. The method of claim 16, further comprising:

detecting a change in location of the device; and communicating audio adjustment instructions to initiate a sound level adjustment of the audio playback based at least in part on the change in location.

18. A system, comprising:

a set of devices having an established Bluetooth connection with a mobile device; and a processor configured to implement an audio controller to:

perform a respective Bluetooth channel sounding procedure with each device of the set of devices to obtain a respective distance to each of the devices; and select a device from the set of devices for audio playback based at least in part on the respective distances and one or more audio quality parameters associated with a respective audio codec of each of the devices.

19. The system of claim 18, wherein, to select the device from the set of devices, the audio controller is configured to select the device based on one of a distance between the device and the mobile device, an audio codec corresponding to the device, or a compromise that takes into account the audio codec corresponding to the device and the distance between the device and the mobile device.

20. The system of claim 18, wherein, to select the device from the set of devices, the audio controller is configured to determine, based at least in part on the one or more audio quality parameters, that the device is associated with a high-definition audio codec.

* * * * *